United States Patent Office 2,914,512
Patented Nov. 24, 1959

2,914,512

COPOLYMER OF A CONJUGATED DIENE AND BIS - (TRI - FLUOROMETHYL) STYRENE AND PROCESS FOR PREPARING A COMPOSITION CONTAINING SAME

Elizabeth Shen Lo, Fords, and George H. Crawford, Jr., Rahway, N.J., assignors, by mesne assignments, to Minnesota Mining and Manufacturing Company, St. Paul, Minn., a corporation of Delaware No Drawing. Application August 27, 1956
Serial No. 606,202

13 Claims. (Cl. 260—82.1)

This invention relates to fluorine-containing polymers containing aromatic nuclei and to a method for the preparation thereof. In one aspect the invention relates to polymers of styrenes having a fluoroalkyl group as a substituent on the benzene ring. In another aspect this invention relates to copolymers of styrenes having two trifluoromethyl groups as substituents on the benzene ring.

It is an object of this invention to provide certain new and useful polymers containing fluorine and aromatic nuclei, said polymers having desirable chemical and physical properties.

Another object is to provide new and useful polymers of trifluoromethyl nuclear-substituted styrenes which polymers possess good elastomeric properties together with good physical and chemical characteristics and which can be easily fabricated into a wide variety of useful articles of improved chemical and physical stability.

Another object is to provide new and useful elastomeric polymers of trifluoromethyl nuclear-substituted styrenes having good low temperature flexibility.

A further object is to provide new and useful polymers of trifluoromethyl nuclear-substituted styrenes which polymers can serve as protective coatings having the aforesaid characteristics and which can be readily applied to the surfaces of a wide variety of useful objects.

A further object of the invention is to provide a process for obtaining these polymers in good yields.

Various other objects and advantages of the present invention will become apparent to those skilled in the art from the accompanying description and disclosure.

Accordingly, these objects are accomplished by the process which comprises copolymerizing a monomer mixture containing a styrene having a fluoroalkyl group as a substituent only on the benzene ring and a diolefin which is preferably a conjugated diolefin, to produce copolymers having good physical and chemical stability. These polymeric products constitute valuable macromolecules and are adaptable to a wide variety of commercial uses.

The copolymer products produced in accordance with the process of this invention are useful as dielectric or insulating materials including dielectrics which are soft and rubbery. The copolymers have good low temperature properties and excellent high temperature properties. For example, these copolymers can be bent at relatively low temperatures without cracking the insulation and at high operating temperatures the insulation does not drip off the wire. The combination of the aromatic ring, the trifluoromethyl groups on the aromatic ring, and the relatively high fluorine content contributes to the desirability of these copolymers for use at high temperatures. The diene comonomers including both hydrocarbon dienes and halogen-substituted dienes contribute to the flexibility and elasticity of the copolymers produced in accordance with this invention and their use also leads to the production of polymeric compositions having aliphatic points of unsaturation. The presence of the aliphatic points of unsaturation is important in that the copolymer can be cross-linked readily by conventional methods known to the art to enhance the range of temperatures at which they may be used. Other characteristics of these polymers which contribute to their use as insulating materials are their low moisture absorption, non-inflammability, good electrical properties, permanence, strength and the fact that they are capable of being formed into various shapes by conventional molding techniques such as compression, injection, and extrusion techniques at temperatures from about 200° F. to about 450° F.

The copolymers also are useful as protective coatings on metal, wood, and other hard surfaces as well as on fabric surfaces which surfaces require protection from moisture and strong chemicals. The polymers either in the form of a dispersion or solution are applied to such surfaces by conventional dipping or brushing techniques.

In general, as more fully described hereinafter, the polymers of the present invention are produced by the polymerization of monomer mixtures comprising a styrene having a fluoroalkyl group which is preferably a trifluoromethyl group, as a substituent only on the benzene ring and a diolefin at temperatures between about −80° C. and about 150° C. with intermediate temperature ranges being selected with reference to the specific polymerization system employed. The most useful polymeric compositions of the present invention are the copolymers produced from monomeric mixtures containing between about 5 mol percent and about 90 mol percent of the trifluoromethyl nuclear-substituted styrene, the remaining major constituent being the diolefin. The preferred polymers of the present invention are the copolymers produced from monomer mixtures containing between about 10 mol percent and about 75 mol percent of the hereindescribed styrenes, the remaining major constituent being the diolefin. The particularly preferred copolymers are those produced from monomer mixtures containing between about 10 and about 65 mol percent of the defined styrenes, the remaining major constituent being the diolefin since these copolymers possess the highest degree of elasticity, high temperature stability, and low temperature flexibility.

Generally speaking, the diolefin comonomers and especially the conjugated butadienes, copolymerize more rapidly than the trifluoromethyl nuclear-substituted styrenes and usually the aforesaid monomer mixtures containing between about 5 and about 90 mol percent of the styrene lead to the production of copolymers containing between about 1 and about 80 mol percent of the styrene; monomer mixtures containing between about 10 and about 75 mol percent of the defined styrene lead to the production of copolymers containing between about 5 and about 60 mol percent of the styrene; and monomer mixtures containing between about 10 and about 65 mol percent of the styrene lead to the production of copolymers containing between about 5 and about 55 mol percent of the styrene, the remaining major constituent in each instance being the diolefin monomer unit.

As indicated above, the styrenes which are copolymerized in accordance with the present invention are those having at least one fluoroalkyl group having from 1 to about 5 carbon atoms per fluoroalkyl group (e.g. a fluoromethyl, fluoroethyl or fluoropropyl group), bonded to a carbon atom of the benzene ring. As a matter of convenience, these fluoroalkyl substituents of the styrene are referred to herein as the nuclear substituents. This monomer may have from 1 to 4 such nuclear substituents and preferably has two fluoroalkyl groups bonded to the benzene ring, the remaining groups bonded to the benzene ring preferably being hydrogen. Typical examples of the preferred styrenes to be employed are the bis-(trifluoromethyl) styrenes such as 2,5-bis-(trifluoromethyl) styrene, 3,5-bis-(trifluoromethyl) styrene, and an admixture thereof.

The diolefins which are copolymerized with the above styrenes as described herein include the hydrocarbon diolefins as well as halogen-substituted diolefins having from 4 to about 10 carbon atoms and preferably not more than 6 carbon atoms per molecule. The preferred diolefins are those having conjugated unsaturation. Typical examples of suitable hydrocarbon diolefins are butadiene and 2-methyl butadiene. Typical examples of the halogen-substituted diolefins to be used are those containing chlorine, fluorine, and any combination thereof and are, for example, 2-chlorobutadiene, 2-fluorobutadiene, 1,1,2-trifluorobutadiene, 1,1,3-trifluorobutadiene, 1,1,4,4-tetrafluorobutadiene, 1,1-difluoro-3-methyl-butadiene, 1,1,3-trifluoro-2-methyl butadiene, 2-trifluoromethyl butadiene and 1,1,2-trifluoropentadiene-1,4.

The copolymerization reaction of the present invention may be effected in the presence of a free radical forming promoter or an ionic type promoter. The polymerization initiators which are suitably employed comprise organic compounds containing a peroxy linkage (i.e. —O—O—); azo compounds; inorganic halides of the Friedel-Crafts type; and Ziegler type catalysts. Generally speaking, such initiators are employed in an amount between about 0.001 and about 5 parts by weight per 100 parts of total monomer employed, preferably in an amount between about 0.01 and about 1.0 part by weight. The polymerization catalyst system may be aqueous or non-aqueous and includes aqueous suspension, aqueous emulsion, the non-aqueous static mass and stirred mass systems, and solution systems. The copolymerization reaction also may be initiated or catalyzed by actinic or ultraviolet radiation without departing from the scope of this invention.

The aqueous catalyst systems comprise water and a peroxy compound as the polymerization initiator. Emulsifiers, activators, accelerators, buffers, and bases also may be included as ingredients of the aqueous systems as desired. One type of aqueous system is that in which an organic peroxide is employed and a second type is that in which an inorganic peroxy compound is used. Exemplary of such organic peroxides are cumene hydroperoxide, diisopropyl benzene hydroperoxide, triisopropyl benzene hydroperoxide, tertiary-butyl hydroperoxide, tertiary-butyl perbenzoate and methyl cyclohexane hydroperoxide. Such organic peroxides usually are employed in conjunction with an emulsifier.

The inorganic peroxy compounds employed as the initiator in aqueous polymerization systems are preferably the water soluble inorganic peroxides such as the perborates, persulfates, perphosphates, percarbonates, barium peroxide, zinc peroxide and hydrogen peroxide. Particularly effective inorganic peroxides are the water soluble salts of the peracids such as the sodium, potassium, calcium, barium and ammonium salts of the persulfuric and perphosphoric acids such as potassium persulfate and sodium perphosphate.

Activators which are often used in conjunction with the peroxy compound comprise sodium bisulfite, sodium metabisulfite, sodium thiosulfate, sodium hydrosulfate, p-toluene sulfinic acid, a reducing sugar such as dextrose and levulose and, in general, any water soluble reducing agent. Such activators are generally employed in an amount between about 0.2 and about 0.8 part by weight per 100 parts of total monomers employed.

Accelerators which may be employed in the aqueous polymerization systems comprise water soluble variable valence metal salts of sulfates, nitrates, phosphates and chlorides such as cuprous sulfate, ferrous sulfate and silver nitrate. Such activators are generally employed in an amount between about 0.01 and about 0.1 part per 100 parts of total monomers employed and preferably in an amount between about 0.05 and 0.5 part by weight. When an activator such as sodium metabisulfite, and an accelerator such as ferrous sulfate are employed, the catalyst system is referred to as a redox system. The above-mentioned organic peroxides are preferably employed in such a redox system.

The emulsifiers which are employed in the preferred aqueous emulsion polymerization systems comprise metal salts such as the potassium or sodium salt derivatives derived from saturated aliphatic acids, the optimum chain length of the acid being between about 14 and about 20 carbon atoms, and the various salt derivatives of fluorochloroalkanoic acids and fluoroalkanoic acids having between about 6 and about 20 carbon atoms per molecule. Typical examples of the derivatives of aliphatic acids which may be employed are potassium stearate and potassium oleate and mixture thereof. The derivatives of fluoroalkanoic acids which may be used include the metal salts of perfluoro acids such as potassium perfluorooctanoate and the derivatives of the polyfluoroalkanoic acids disclosed in U.S. Patent No. 2,559,752 as being effective dispersing agents in polymerization reactions. The preferred fluorochlorocarboxylic acid derivatives which may be used as emulsifiers are those of the perfluorochloro acids obtained upon hydrolysis of trifluorochloroethylenesulfuryl chloride telomers in fuming sulfuric acid. Such perfluorochloro acids have the successively recurring unit, $-CF_2-CFCl-$, and a chlorine-containing end group and an even number of carbon atoms which is preferably between about 6 and about 14 carbon atoms. Typical examples of such emulsifiers are the potassium, sodium, and ammonium salts of 3,5,7,8-tetrachloroundecafluorooctanoic acid and of 3,5,6-trichlorooctafluorohexanoate. The emulsifier is generally employed in a quantity between about 0.2 and about 10 parts by weight per 100 parts of total monomer and preferably between about 0.5 and about 5.0 parts by weight are used.

Buffering agents may be used to maintain appropriate pH conditions during the polymerization reaction. Typical examples of suitable buffers are disodium hydrogen phosphate, and sodium metaborate. The buffers are generally employed in an amount between about 1.0 and about 4.0 parts by weight per 100 parts water, or enough to maintain the pH of the system at a value which is preferably 7 or above.

The polymerization process of the present invention also may be effected in a non-aqueous mass or bulk polymerization system comprising an organic peroxy compound or an azo compound. The organic peroxides which may be used include the aliphatic and aromatic peroxy compounds as well as the fluorine and chlorine substituted organic peroxides. Exemplary of suitable aliphatic peroxides are diacetyl peroxide, lauroyl peroxide, tertiary-butyl peroxide, caprylyl peroxide, trichloroacetyl peroxide, perfluoropropionyl peroxide, 3-carboxy propionyl peroxide, 3,4-dibromobutyryl peroxide, trifluoroacetyl peroxide, difluoro acetyl peroxide and perfluorononanoyl peroxide. Exemplary of the suitable aromatic peroxides are benzoyl peroxide, p-nitrobenzoyl peroxide and 2,4-dichlorobenzoyl peroxide. Examplary of the azo compounds which may be employed are alpha, alpha-azo-isobutyronitrile, alpha, alpha-azo-methylnitrile and alpha, alpha-azo-ethylnitrile.

As indicated above, Ziegler type catalysts also are suitable initiators for the copolymerization of the above-defined fluoromethyl styrenes with the diene comonomer. The preferred Ziegler catalysts which may be used are the compounds of metals of group III–A (i.e. aluminum, gallium, and indium) in which the metal is bonded to at least one alkyl grup and in which the remaining valences of the metal are bonded to hydrogen, halogen, or an alkyl group, and any combination thereof. Typical examples of suitable Ziegler type catalysts which can be employed are as follows: beryllium dihydride, triethyl aluminum, triethyl indium, triisobutyl aluminum, triethyl gallium, diethyl aluminum bromide, diethyl aluminum chloride, and the like. Such catalysts may be used as essentially the sole polymerization initiator or they may be used in combination with various derivatives, preferably the halides, of metals of groups IV-B, V-B, VI-B, and VIII of the periodic system and are, for example, titanium tetrachloride, zirconium tetrachloride, and ferric chloride. The concentration of the cocatalyst such as titanium tetrachloride with respect to the Ziegler catalyst such as diethyl aluminum bromide may vary over relatively wide limits such as from 0.05 to about 2.0 moles and preferably from 0.1 to about 0.5 mole of cocatalyst per mol of Ziegler catalyst.

As indicated above, the copolymerization of the fluoromethyl nuclear-substituted styrenes with the diolefin comonomers may be effected at a temperature from about −80° to about 150° C., preferably at a temperature from about −40° C. to about 100° C. When one of the above-described aqueous systems is used, a temperature from about 0° C. to about 100° C. preferably from 15° C. to about 80° C. is employed. When a mass type polymerization catalyst system is employed, the temperature usually is between about −30° C. and about 150° C., the lower temperatures, i.e. below 65° C., being employed when a halogenated peroxide is used, and the higher temperatures are usually used when benzoyl peroxide or tertiary-butyl peroxide is employed. When a Ziegler type catalyst is employed, the temperature of the copolymerizing system may be as low as −80° C. and is usually between about −40° C. and about 100° C.

The herein-described copolymerization process may be carried out at atmospheric pressure or autogenous pressure or superimposed pressures up to about 150 atmospheres or higher. The residence time may vary over relatively wide limits such as 0.5 hour to about 100 hours but the copolymerization is usually allowed to proceed for a period between about 2 and about 75 hours.

The copolymerization process of the present invention can be carried out in a batchwise or continuous manner as desired. One method of continuous operation involves continuously charging a mixture of the comonomers to a polymerization zone containing the catalyst solution while maintaining a constant pressure in the reaction zone, the pressure in the zone being maintained below the pressure at which one and preferably both of the monomers condense at a specific temperature of reaction and continuously withdrawing the polymer product as it is formed.

It has been found that the addition of various polymerization modifiers appreciably reduces the molecular weight of the copolymer products thereby increasing their solubility and ease of fabrication without unduly affecting the over-all yield. Suitable polymerization modifiers include mercaptans such as dodecyl mercaptan, sulfuryl halides such as sulfuryl chloride, and halogenated organic compounds such as chloroform, 1,1,2-trichlorotrifluoroethane (Freon 113), carbon tetrachloride, bromotrichloromethane and trichloroacetyl chloride. Such modifiers are preferably added in amounts between about 0.1 and about 2 parts by weight per 100 parts of total monomers charged to the polymerization reaction zone.

Plasticizers and finely divided solids which serve as fillers can be included in the polymerization mixture and the polymerization can be carried out in their presence. Examples of suitable fillers include pigments such as titanium oxide, metals such as copper and iron powder and other finely divided materials such as mica and asbestos. These and similar materials can also be added to the preformed polymers.

The following examples are offered as a better understanding of the present invention and are not to be construed as unnecessarily limiting thereto. The bis-(trifluoromethyl) styrene employed in the following examples has a boiling point of 55–60° C. at 20 mm. mercury pressure and was prepared by the following sequence of reactions:

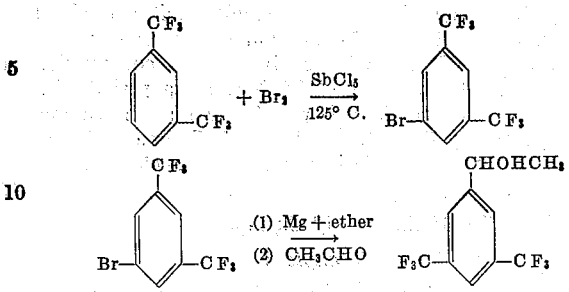

The carbinol was then dehydrated in the presence of phosphorus pentoxide to yield the desired bis-(trifluoromethyl) styrene.

Example 1

This example illustrates the copolymerization of bis-(trifluoromethyl) styrene with butadiene.

A heavy walled glass polymerization tube of about 20 ml. capacity was flushed with nitrogen. Thereafter there was charged to this polymerization tube 5 percent by weight of a solution prepared by dissolving 5 grams of potassium stearate in 100 ml. of water adjusted to a pH of 11 with potassium hydroxide. The contents of the tube were then frozen and thereafter there was added to the tube 5 percent by weight of a solution prepared by dissolving one gram of potassium persulfate in 80 ml. of water. The contents of the tube were then once more frozen. Thereafter there was added to the tube 5 percent by weight of a solution prepared by dissolving 0.4 gram of sodium metabisulfite and 0.5 gram of borax in 20 ml. of water. The entire contents of the tube were once more frozen and the tube was evacuated at liquid nitrogen temperature followed by the addition thereto of 4.07 grams of bis-(trifluoromethyl) styrene and 0.93 gram of butadiene-1,3 making up a total monomer mixture containing 50 mol percent of each monomer. After sealing the tube, the tube and its contents were then agitated in a temperature-regulated water bath at 50° C. for a period of 24 hours. At the end of this time, the contents of the tube were coagulated by freezing. The coagulated product was then removed from the tube, washed with hot water, and then dried to constant weight in vacuo at 35° C. A copolymeric product was obtained which upon analysis was found to comprise approximately 34.5 mol percent of the bis-(trifluoromethyl) styrene monomer unit and the remaining major constituent, namely the butadiene monomer unit being present in an amount of about 65.5 mol percent. The copolymer was obtained in an amount corresponding to a 20 percent conversion.

A sample of the raw copolymer was compression molded at a temperature of 250° F. for a period of 5 minutes. After molding, it was found that the sample was thoroughly firm and flexible. A Gehman stiffness according to ASTM designation D-1053-49T was as follows:

$$T_5 = +5.5° \text{ C.}; \quad T_{10} = +3.5° \text{ C.}; \quad T_{100} = +0.5° \text{ C.}$$

Example 2

This example illustrates the copolymerization of bis-(trifluoromethyl) styrene with 2-fluorobutadiene.

Employing the procedure set forth in Example 1 and the same aqueous emulsion polymerization system, the tube was charged with 3.85 grams of bis-(trifluoromethyl) styrene and 1.15 grams of 2-fluorobutadiene-1,3 which comprised a monomer mixture containing 50 mol percent of each monomer. The polymerization reaction was conducted under autogenous pressure at a temperature of about 50° C. for a period of 24 hours. The resultant elastomeric product was worked up in accordance with the same procedure as set forth in Example 1. A rubbery product was obtained which upon analysis was shown to contain approximately 29.5 mol percent of the bis-(trifluoromethyl) styrene monomer unit and about 70.5 mol percent of the 2-fluorobutadiene monomer unit.

A sample of the raw copolymer was compression molded at a temperature of 250° F. for a period of 5 minutes. After molding, it was found that the sample was thoroughly firm and flexible. A Gehman stiffness according to ASTM designation D–1053–49T was as follows:

$T_5 = 3°$ C.; $T_{10} = 1°$ C.; $T_{100} = -4°$ C.

Example 3

This example illustrates the copolymerization of bis-(trifluoromethyl) styrene and 2-chlorobutadiene.

A heavy walled glass polymerization tube having a volume capacity of about 20 ml. was flushed with nitrogen. Thereafter there was charged to the tube 5 percent by weight of a solution prepared by dissolving 5 grams of potassium stearate in 100 ml. of water adjusted to a pH of 11 with potassium hydroxide. The contents of the tube were then frozen. Thereafter there was added to the tube 5 percent by weight of a solution prepared by dissolving 1 gram of potassium persulfate in 80 ml. of water. The contents of the tube were then once more frozen. Thereafter there was added to the tube 5 percent by weight of a solution prepared by dissolving 0.4 gram of sodium metabisulfite in 20 ml. of water. The entire contents of the tube were once more frozen followed by the addition to the tube of 3.65 grams of bis-(trifluoromethyl) styrene and 1.35 grams of 2-chlorobutadiene making up a total monomer mixture containing 50 mol percent of each of the monomers. The polymerization reaction was allowed to proceed under autogenous pressure at a temperature of 50° C. for a period of 24 hours. At the end of this time, the contents of the tube were coagulated by freezing. The coagulated product was then removed from the tube, washed with hot water, and then dried to constant weight in vacuo at 35° C. A copolymeric product was obtained which upon analysis was found to comprise approximately 24 mol percent of the bis-(trifluoromethyl) styrene and approximately 76 mol percent of the 2-chlorobutadiene monomer unit. The copolymer was obtained in an amount corresponding to a 67 percent conversion.

Example 4

This example illustrates the copolymerization of bis-(trifluoromethyl) styrene with 1,1,3-trifluorobutadiene.

Employing the procedure set forth in Example 1 above and the same aqueous emulsion polymerization system, the tube was charged with 3.45 grams of bis-(trifluoromethyl) styrene and 1.55 grams of 1,1,3-trifluorobutadiene making up a total monomer mixture containing 50 mol percent of each of the monomers. The copolymerization reaction was carried out under autogenous pressure at a temperature of 50° C. for a period of 26 hours to produce a rubbery copolymer of the bis-(trifluoromethyl) styrene and the 1,1,3-trifluorobutadiene in good yield.

Example 5

This example illustrates the copolymerization of bis-(trifluoromethyl) styrene with 2-trifluoromethyl butadiene.

Employing the procedure set forth in Example 3 and the same aqueous emulsion polymerization system, the tube was charged with 3.32 grams of bis-(trifluoromethyl) styrene and 1.68 grams of 2-trifluoromethyl butadiene making up a total monomer mixture containing 50 mol percent of each monomer. The polymerization reaction was carried out under autogenous pressure at a temperature of 50° C. for a period of 24 hours. The resultant elastomeric product was worked up in accordance with the same procedure as set forth in Example 3. A rubbery product was obtained and upon analysis was found to comprise approximately 25 mol percent of the bis-(trifluoromethyl) styrene monomer unit and about 75 mol percent of the 2-trifluoromethyl butadiene monomer unit.

Example 6

This example illustrates the copolymerization of bis-(trifluoromethyl) styrene with 1,1,2-trifluoropentadiene-1,4.

The 1,1,2-trifluoropentadiene-1,4 monomer employed in this example has a boiling point of 38° C. and a density of 1.04 grams/cc. at 25° C. It is prepared according to the following series of reactions:

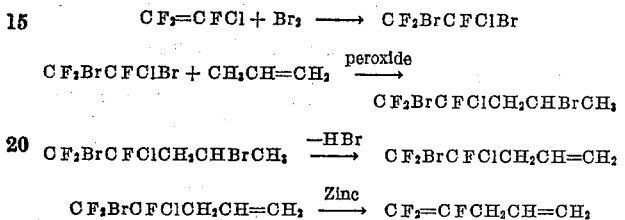

Employing the procedure set forth in Example 1 above and the same aqueous emulsion polymerization system, the tube was charged with 3.32 grams of bis-(trifluoromethyl) styrene and 1.68 grams of 1,1,2-trifluoropentadiene-1,4 to make up a total monomer mixture containing 50 mol percent of each of the monomers. The copolymerization reaction was carried out under autogenous pressure at a temperature of 50° C. for a period of 26 hours to produce a powdery copolymer of the bis-(trifluoromethyl) styrene and the 1,1,2-trifluoropentadiene in a 30 percent conversion.

Example 7

After flushing a 10 ml. glass polymerization tube with nitrogen, 0.1 gram of diethyl aluminum bromide is added thereto. The contents of the tube are then frozen at liquid nitrogen temperature followed by the addition of 0.05 gram of titanium tetrachloride. After refreezing the contents of the tube at liquid nitrogen temperature, a monomeric mixture containing 30 mol percent of bis-(trifluoromethyl) styrene and 70 mol percent of 1,1,2-trifluorobutadiene are condensed into the tube in the absence of air and moisture. The tube is then sealed and the polymerization reaction is allowed to proceed at a temperature of —20° C. for a period of about 24 hours to yield a flexible copolymer of bis-(trifluoromethyl) styrene and 1,1,2-trifluorobutadiene in about a 40 percent conversion.

When employed as protective coatings on any of the surfaces previously described, the raw copolymer is dissolved in a suitable solvent such as ethyl acetate, methyl ethyl ketone or acetone, etc., and is applied to the desired surfaces employing such apparatus as a knife spreader or a doctor blade or a reverse roll cutter. The solvent after the copolymeric coating composition has been applied to the surface is permitted to evaporate. This also may be accomplished in the presence of cross-linking agents at elevated temperatures, if so desired. In many applications it is desirable to include in the copolymeric coating composition various vulcanizing agents. In the latter case, supplementary heat treatment of the coating is required either during the solvent removal step or thereafter. After the solvent has been completely evaporated, the coated surface is ready for use. In this respect, it should be noted that the polymeric coating composition may be applied to the surface either as a single coating or if so desired, the protective coating may be built up by the application of several layers, each layer being permitted to harden by solvent evaporation before the next layer is applied. Furthermore, if so desired, the protective coatings or the polymeric composition when obtained in the form of sheets may be pigmented.

Other uses for the polymeric compositions of the present invention reside in the fabrication of pump valves, O-rings, sheet and valve discs, grommets, tubing and pressure sensitive tape for electrical insulation purposes.

Various alterations and modifications of the polymeric compositions of the present invention and of the process employed in their manufacture may become obvious to those skilled in the art without departing from the scope of the present invention.

Having thus described our invention, we claim:

1. A copolymer of bis-(trifluoromethyl) styrene and butadiene.
2. A copolymer of bis-(trifluoromethyl) styrene and 2-fluorobutadiene.
3. A copolymer of bis-(trifluoromethyl) styrene and 2-chlorobutadiene.
4. A copolymer of bis-(trifluoromethyl) styrene and 1,1,3-trifluorobutadiene.
5. A copolymer of bis-(trifluoromethyl) styrene and 2-trifluoromethyl butadiene.
6. A process for preparing a polymeric composition which comprises polymerizing a monomer mixture of bis-(trifluoromethyl) styrene and a polymerizable conjugated butadiene in the presence of a free radical-forming compound selected from the group consisting of organic and inorganic peroxides as a polymerization promoter at a temperature between about −40° C. and about 100° C., said mixture containing between about 10 mol percent and about 75 mol percent of the bis-(trifluoromethyl) styrene and correspondingly between about 90 mol percent and about 25 mol percent of the butadiene.
7. A process for preparing a polymeric composition which comprises polymerizing a monomer mixture of bis-(trifluoromethyl) styrene and butadiene in an aqueous system comprising a free radical-forming compound selected from the group consisting of organic and inorganic peroxides as a polymerization promoter at a temperature between about 0° C. and about 100° C.
8. A process for preparing a polymeric composition which comprises polymerizing a monomer mixture of bis-(trifluoromethyl) styrene and 2-fluorobutadiene in an aqueous system comprising a free radical-forming compound selected from the group consisting of organic and inorganic peroxides as a polymerization promoter at a temperature between about 0° C. and about 100° C.
9. A process for preparing a polymeric composition which comprises polymerizing a monomer mixture of bis-(trifluoromethyl) styrene and 2-chlorobutadiene in an aqueous system comprising a free radical-forming compound selected from the group consisting of organic and inorganic peroxides as a polymerization promoter at a temperature between about 0° C. and about 100° C.
10. A process for preparing a polymeric composition which comprises polymerizing a monomer mixture of bis-(trifluoromethyl) styrene and 1,1,3-trifluorobutadiene in an aqueous system comprising a free radical-forming compound selected from the group consisting of organic and inorganic peroxides as a polymerization promoter at a temperature between about 0° C. and about 100° C.
11. A process for preparing a polymeric composition which comprises polymerizing a monomer mixture of bis-(trifluoromethyl) styrene and 2-trifluoromethyl butadiene in an aqueous system comprising a free radical-forming compound selected from the group consisting of organic and inorganic peroxides as a polymerization promoter at a temperature between about 0° C. and about 100° C.
12. A copolymer of a polymerizable conjugated diene containing from 4 to 10 carbon atoms and bis-(trifluoromethyl) styrene.
13. A copolymer of between about 5 and about 55 mol percent of bis-(trifluoromethyl) styrene and between about 95 and 45 mol percent of butadiene.

References Cited in the file of this patent

UNITED STATES PATENTS

| | | |
|---|---|---|
| 2,668,164 | Swart et al. | Feb. 2, 1954 |
| 2,752,330 | Hetzel | June 26, 1956 |